July 7, 1953  R. D. INGALLS  2,644,728
CANTILEVER TYPE BEARING
Filed April 24, 1948  2 Sheets-Sheet 1
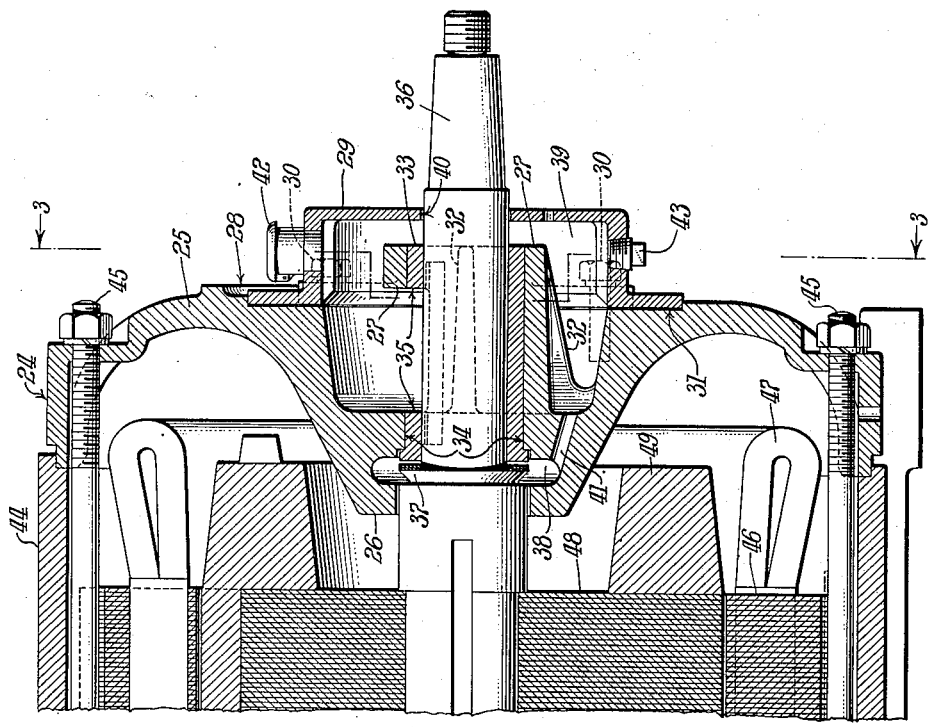
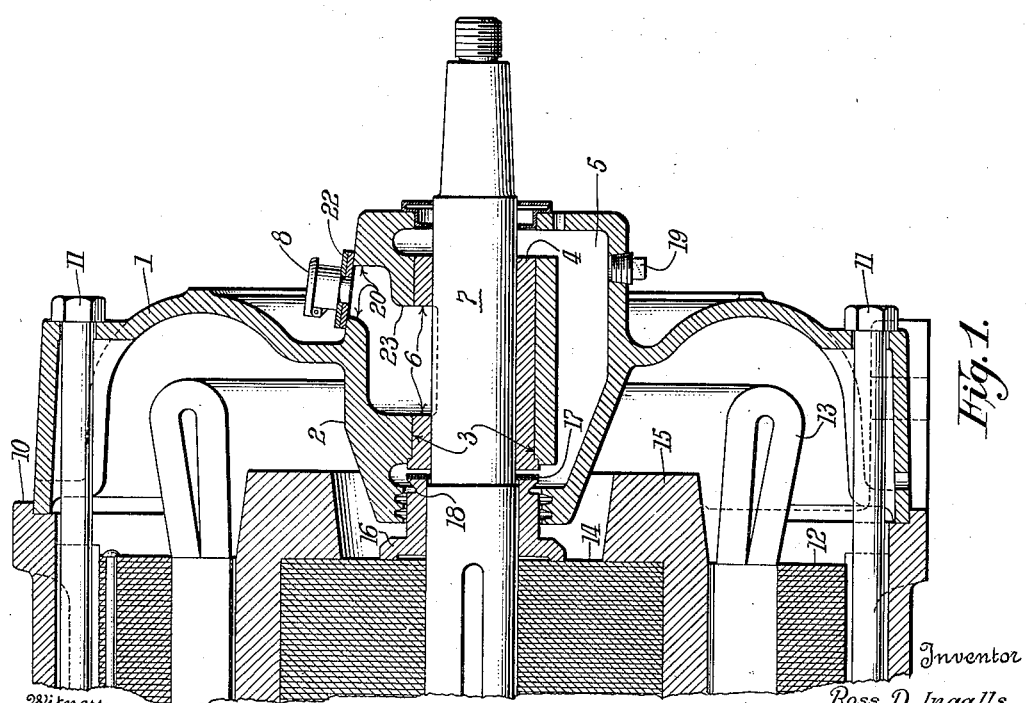
Inventor
Ross D. Ingalls July 7, 1953  R. D. INGALLS  2,644,728
CANTILEVER TYPE BEARING
Filed April 24, 1948  2 Sheets-Sheet 2

Witness:
Godfrey Picina

Inventor
Ross D. Ingalls
By William P. Stewart
Attorney

Patented July 7, 1953

2,644,728

UNITED STATES PATENT OFFICE 2,644,728

CANTILEVER TYPE BEARING

Ross D. Ingalls, New Providence, N. J., assignor to The Singer Manufacturing Company, Elizabeth, N. J., a corporation of New Jersey Application April 24, 1948, Serial No. 23,065

2 Claims. (Cl. 308—22)

This invention relates to bearing structures for dynamoelectric machines and more particularly to the type employing sleeve bearings with waste packing or ring oiling.

Heretofore, in bearings of this type, the outer end of the bearing sleeve has been supported by a web or strut connection to the end-bell casting. In the waste-packed type, it has required the tedious packing of the waste around the shaft at the bearing window by working through the small casting aperture, which, at best, is an awkward and a time-consuming process. When it has been desirable to use a ring oiler with this type bearing, a split ring has been necessary.

It is a primary object of this invention, therefore, to provide a shaft bearing in which the interior parts are easily accessible through an end aperture which is later closed by a sealed cap.

It is a further object of this invention to provide a bearing which presents no supporting obstructions at its free end and projects somewhat beyond the face of the end-bell.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 4:
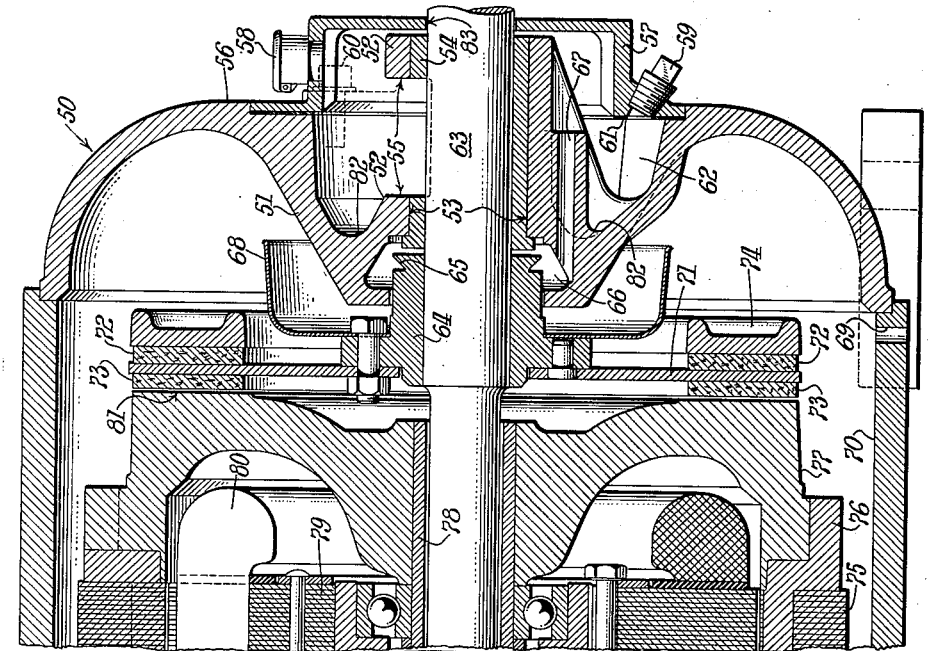
Figure 3:
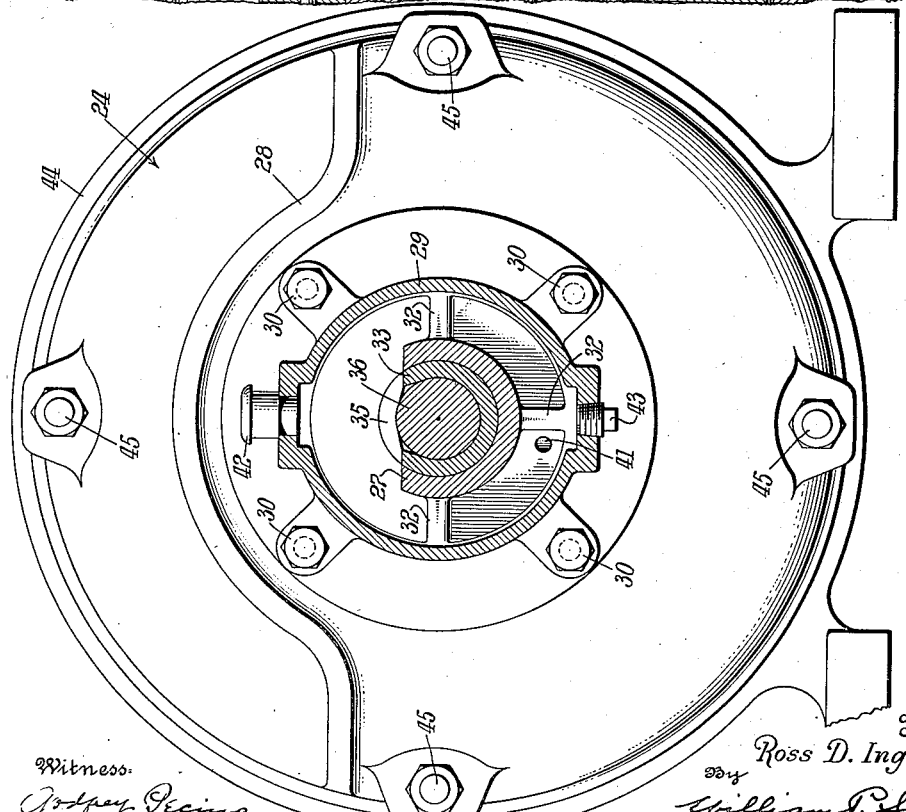

In the drawings, Fig. 1 is a horizontal sectional view through a portion of a dynamoelectric machine showing a prior art bearing structure. Fig. 2 is a horizontal sectional view through a portion of a dynamoelectric machine showing a bearing structure embodying the invention. Fig. 3 is a transverse sectional view taken on the line 3—3 of Fig. 2. Fig. 4 is a horizontal sectional view through a portion of a dynamoelectric machine showing a modification of the bearing structure of Fig. 1.

Referring now to the prior art structure of Fig. 1, an end-bell or end-cover 1 is formed with a central body portion 2 containing a bore 3 in which is received a bearing bushing 4. The body portion is cored to form a chamber 5 in which oil is retained for lubricating the bearing. A window 6 is cut transversely through the bore 3 and the bushing 4 to expose part of a shaft 7. The window 6 communicates with the chamber 5 and with an oiler 8, and packing waste (not shown) may be stuffed in around the window and down into the chamber so that oil may be drawn up from the chamber by capillary action and fed to the shaft 7 whence it spreads in a thin film between said shaft and the bearing bushing for lubricating same.

The end-bell 1 is secured to a stator frame 10 by means of through-bolts 11. A stator core 12 with windings 13 is secured to the stator frame 10. A rotor core 14, carrying a cast winding 15, is keyed to the shaft 7 for rotation within the stator core 12 in conventional manner. A thrust collar 16, secured to the shaft 7 with one end thereof abutting the rotor core 14, provides means for transmitting thrust from the shaft to the bearing bushing through the agency of end-play washers 17. The thrust collar is formed with an annular groove 18 which provides an oil slinger so that any oil traveling down the shaft towards the core is caught and slung off by centrifugal action and caught within the chamber 5 to be returned to the body of oil contained therein. A drain plug 19 is provided at the low point of the chamber for emptying the chamber when changing oil. It will be observed that the above construction provides but limited access to the bearing window for installing the waste packing. This is accomplished by rather difficult entry through the aperture 20, into which the oiler 8 is fitted, by removal of a plate 22 to which the oiler is attached. The installation of waste packing is a blind operation as far as the under side of the bearing is concerned and this is a critical region because it controls the efficacy with which the packing picks up oil from the chamber. It will also be seen that the installation of an oil ring in this structure poses a real problem. A supporting web portion 23 prevents the slipping on of a closed oil ring over the bushing from the end and makes necessary the use of an undesirable split ring construction when ring oiling is desired. Needless to say, adequate inspection of the bearing is not possible with this prior art construction.

Turning now to Fig. 2, an end-bell or end-cover 24 is formed with an annular casing portion 25 having a transverse web portion 26 which carries a bearing boss 27 centrally supported within said casing. The bearing boss is secured at one end to said transverse web portion 26 as a cantilever and extends inwardly through said casing so that its free end projects longitudinally beyond the end portion 28 of said casing. A flanged cap member 29 is secured to the casing 25 by means of tap screws 30 which urge said cap member against said casing to form an oil-tight joint by the interposition therebetween of a gasket 31. The bearing boss is stiffened by means of longitudinal struts 32, thus eliminating the necessity for any transverse support at the free end similar to the strut shown at 23 in Fig. 1. A bearing bushing 33 is fitted within a bore 34 in the boss 27 and both bushing and boss are partially cut away to form a bearing window 35 which exposes the top of a shaft 36 which is journaled in said bearing. A combined thrust collar and oil slinger 37 is formed on the shaft. Surrounding this part of the shaft and formed in the web portion 26 is an annular groove 38, forming a chamber in which is caught the oil slung off the shaft by the slinger 37. It is clear that the cap 29 forms, with the casing 25, a chamber or reservoir 39 for retaining a supply of lubricating oil. Waste packing (not shown) is applied around the window and extends down into the bottom of the chamber 39 from which oil is drawn by capillary action to the shaft. The oil caught in groove 38 may drain back into the reservoir 39 through a duct 41 provided therefor. An oiler 42 and a drain plug 43 are secured to the cap 29, respectively for filling and draining the bearing. An aperture 40 in the cap 29 provides clearance for the extension of the shaft 36.

It will be seen that, with the cap 29 removed, the bearing is completely exposed and accessible for work and inspection. Placement of waste packing or a ring oiler can readily be made with full access through the large aperture so provided.

The end-bell 24 is secured to a stator frame 44 by means of through-bolts 45. A stator core 46, carrying winding 47, is secured in the stator frame, and a rotor core 48, carrying a cast winding 49, is secured to the shaft 36 in accordance with structure well known in the art of dynamoelectric machines.

It will be seen that the bearing assembly of Figs. 2 and 3 requires a much simpler core than that of the prior art, due principally to the fact that, according to the invention, the difficult enclosing contours are provided by a separate cap element 29 which can be made as a simple die casting or pressed part, and assembled with the end-bell to form the bearing enclosure.

Fig. 3 clearly shows the unobstructed annular entry space made available surrounding the bearing boss 27 by the removal of the cap 29.

Referring to Fig. 4, there is illustrated a bearing structure, modified somewhat from that shown in Figs. 2 and 3, and more particularly adapted to that type of motor in which the output shaft is connected to the rotor by means of a clutch. An end-bell 50 is formed with a transverse web portion 51 which carries a bearing boss 52 having therein a bore 53. A bushing 54 is supported within the bore and a transverse cut, through both bushing and bore, provides a bearing window 55 which exposes part of a shaft 63. The boss 52 is supported as a cantilever and has its free end extending beyond the face portion 56 of the end-bell 50. A cap member 57, carrying an oiler 58 and a drain plug 59, is secured to the end-bell by means of tap screws 60 and forms therewith and, through the agency of a gasket 61, an oil retaining reservoir or chamber 62. Waste packing (not shown) is installed in the chamber and fills the bearing window 55 so that oil may be drawn up from the chamber 62 and distributed to the shaft 63, whence it may be fed between the shaft and the bushing 54 to lubricate same. An aperture 83 in the cap 57 provides clearance for the extension of the shaft 63.

Secured to the shaft is a hub 64 formed at one end with an inclined grooved portion 65 which serves as an oil slinger. This portion runs within an annular chamber 66 which is connected to the oil chamber 62 by means of a duct 67. Thus oil which travels inwardly along the shaft 63 may be slung outwardly by the oil slinger 65 to be caught in chamber 66 whence it flows through duct 67 into reservoir 62 to rejoin the main body of oil therein.

The hub 64 carries an oil shield cup 68 which rotates with the shaft, and any oil which may get past the slinger 65 is caught by it and thrown against the inner wall of the end-bell 50, whence it drains out through a hole 69 in a stator frame 70. Also secured to the hub 64 is a sheet metal disc 71 which carries at the periphery on opposite faces thereof the friction elements 72 and 73. A stationary brake band 74 is secured to the stator frame 70 by means not shown. A rotor core 75 and cast winding 76 is connected by a spider 77 for rotation with a hollow shaft 78. A stator core 79 and a winding 80 is supported within the rotor core. As shown in Fig. 4, the shaft 63 is braked against rotation by frictional engagement of the element 72 with the band 74. To produce rotation of the shaft 63, endwise movement to the left is imparted to it whereupon the elements 72 and 74 are disengaged and the element 73 is placed in frictional engagement with a surface 81 of the spider 77. This provides a driving connection between the rotor core 75 and the shaft 63.

While the motor structure described immediately above forms no direct part of this invention, it is included here to emphasize the importance of the oil isolating function of the bearing structure. For example, it is essential that no oil reach and thereby impair the friction surfaces between elements 72 and 74, and elements 73 and 81. The shield cup 68 is effective in accomplishing this. Further, to minimize oil leakage to the interior of the motor case, particularly if the motor is up-ended in handling, the oil chamber 62 is formed with an annular pocket portion 82 removed radially from the shaft, and into which the oil may flow and remain trapped out of direct contact with the shaft, thus to prevent leakage along said shaft as long as the machine remains in the up-ended position.

From the foregoing description it will be perceived that I have provided a sleeve bearing structure which gives maximum access and permits entry to the important parts for ready installation of waste packing or oil rings and for full inspection after the installation thereof. This is accomplished primarily by the use of (1) a bearing boss which is supported as a cantilever with its free end projecting externally of the bearing support and (2) a removable cap which covers the projecting end of said boss and forms with the bearing support an oil retaining chamber.

Having thus set forth the nature of the invention, what I claim herein is:

1. A bearing assembly comprising a support formed with an annular portion having at one end a transverse web and at the other end an apertured portion, a bearing boss secured at one end to said web and provided with a bore disposed coaxially with said annular portion and extending through said apertured portion with its free end beyond the end of said annular portion, a shaft-receiving bearing sleeve disposed in said bore, and a cap forming a removable closure element for said bearing assembly and provided with a central aperture in coaxial alignment with said bearing bore.

2. An end-cover for a dynamoelectric machine comprising an annular casing formed at one end with an aperture, a bearing boss centrally supported within said casing and projecting at one end through said aperture to the exterior of said casing, said boss being formed with a bore coaxially disposed relative to said casing, a bearing bushing carried by said bore, and a cap member removably secured to said casing to cover said aperture and said projecting boss.

ROSS D. INGALLS.

References Cited in the file of this patent

UNITED STATES PATENTS

| Number | Name | Date |
|---|---|---|
| 486,175 | Angell | Nov. 15, 1892 |
| 669,613 | Bassett | Mar. 12, 1901 |
| 1,017,132 | Burke | Feb. 13, 1912 |
| 1,715,698 | Ehrenfeld | June 4, 1929 |
| 1,822,859 | Perkins | Sept. 8, 1931 |
| 2,306,743 | Morrill | Dec. 29, 1942 |
| 2,316,693 | Hoddy | Apr. 13, 1943 |

FOREIGN PATENTS

| Number | Country | Date |
|---|---|---|
| 505,498 | Great Britain | May 10, 1939 |